(12) United States Patent
Murai et al.

(10) Patent No.: US 8,165,569 B2
(45) Date of Patent: Apr. 24, 2012

(54) METHOD FOR DISTRIBUTING VIDEO INFORMATION TO MOBILE PHONE BASED ON PUSH TECHNOLOGY

(75) Inventors: Takashi Murai, Yokosuka (JP); Hiroki Hayashi, Yokohama (JP)

(73) Assignee: Alcatel Lucent, Paris (FR)

( * ) Notice: Subject to any disclaimer, the term of this patent is extended or adjusted under 35 U.S.C. 154(b) by 1470 days.

(21) Appl. No.: 10/781,628

(22) Filed: Feb. 20, 2004

(65) Prior Publication Data

US 2004/0203712 A1 Oct. 14, 2004

(30) Foreign Application Priority Data

Apr. 10, 2003 (JP) ................................. 2003-106492

(51) Int. Cl.
*H04M 1/725* (2006.01)
(52) U.S. Cl. ................. 455/414.2; 455/3.04; 455/414.3; 455/412.2; 455/456.2; 455/456.5; 455/456.6; 455/566; 455/466; 455/435.1; 455/3.06; 455/67.11; 455/423; 455/422.1
(58) Field of Classification Search .... 455/456.1–456.6, 455/414.1–414.4, 556.1, 556.2, 566, 418–420, 455/466; 370/351, 352, 522; 709/201–253
See application file for complete search history.

(56) References Cited

U.S. PATENT DOCUMENTS

| | | | |
|---|---|---|---|
| 6,456,234 B1 * | 9/2002 | Johnson | 342/357.09 |
| 6,532,415 B2 * | 3/2003 | Nishikawa | 701/200 |
| 6,553,178 B2 * | 4/2003 | Abecassis | 386/83 |
| 6,611,654 B1 * | 8/2003 | Shteyn | 386/83 |
| 6,865,398 B2 * | 3/2005 | Mangal et al. | 455/552.1 |
| 6,965,770 B2 * | 11/2005 | Walsh et al. | 455/426.1 |
| 6,970,712 B1 * | 11/2005 | Vo | 455/510 |
| 6,996,393 B2 * | 2/2006 | Pyhalammi et al. | 455/412.1 |
| 7,003,040 B2 * | 2/2006 | Yi | 375/240.24 |
| 7,016,706 B2 * | 3/2006 | Kurokawa et al. | 455/566 |
| 7,039,672 B2 * | 5/2006 | Wu et al. | 709/201 |
| 7,107,010 B2 * | 9/2006 | Heinonen et al. | 455/41.2 |
| 7,142,204 B2 * | 11/2006 | Shiotsu et al. | 345/211 |
| 7,200,633 B2 * | 4/2007 | Sekiguchi et al. | 709/203 |
| 7,212,783 B2 * | 5/2007 | Gaumond et al. | 455/3.06 |
| 7,221,903 B2 * | 5/2007 | Kuramitsu | 455/3.06 |
| 7,536,704 B2 * | 5/2009 | Pierre et al. | 725/58 |
| 7,599,691 B1 * | 10/2009 | Mitchell | 455/431 |
| 7,606,215 B2 * | 10/2009 | Poniatowski | 370/352 |
| 2002/0065074 A1 * | 5/2002 | Cohn et al. | 455/422 |
| 2002/0126708 A1 * | 9/2002 | Skog et al. | 370/522 |
| 2002/0194609 A1 * | 12/2002 | Tran | 725/95 |
| 2003/0032435 A1 * | 2/2003 | Asada et al. | 455/456 |
| 2003/0078986 A1 * | 4/2003 | Ayres et al. | 709/217 |
| 2003/0124973 A1 * | 7/2003 | Sie et al. | 455/2.01 |
| 2003/0195940 A1 * | 10/2003 | Basu et al. | 709/213 |
| 2003/0196209 A1 * | 10/2003 | Lee et al. | 725/122 |
| 2004/0021555 A1 * | 2/2004 | Faris | 340/7.52 |
| 2004/0111476 A1 * | 6/2004 | Trossen et al. | 709/206 |

(Continued)

*Primary Examiner* — Willie J Daniel, Jr.
(74) *Attorney, Agent, or Firm* — Sughrue Mion, PLLC

(57) ABSTRACT

The present invention provides a new method for distributing video information to a mobile phone based on push technology where a new function of a mobile phone is utilized sufficiently. In case that a user has registered that the user makes a request for a video information distribution service about a specific area to a user management sever in advance, when a mobile phone of the user exists in the specific area, video information is distributed from a video contents server to the mobile phone of the user based on push technology. Alternatively, when traffic of a radio channel connected to the mobile phone carried by the user is lower than a predetermined threshold, video information is distributed from a video contents server to the mobile phone based on push technology.

5 Claims, 11 Drawing Sheets

U.S. PATENT DOCUMENTS

| | | | |
|---|---|---|---|
| 2004/0122907 A1* | 6/2004 | Chou et al. | 709/207 |
| 2004/0143841 A1* | 7/2004 | Wang et al. | 725/32 |
| 2004/0177378 A1* | 9/2004 | Cool | 725/89 |
| 2004/0229655 A1* | 11/2004 | Jang | 455/566 |
| 2005/0136949 A1* | 6/2005 | Barnes, Jr. | 455/461 |
| 2005/0289216 A1* | 12/2005 | Myka et al. | 709/201 |
| 2006/0183465 A1* | 8/2006 | Helferich | 455/412.2 |
| 2007/0037549 A1* | 2/2007 | Poltorak | 455/404.1 |
| 2007/0129074 A1* | 6/2007 | Bloebaum et al. | 455/434 |
| 2007/0178830 A1* | 8/2007 | Janik et al. | 455/3.06 |

* cited by examiner

METHOD FOR DISTRIBUTING VIDEO INFORMATION TO MOBILE PHONE BASED ON PUSH TECHNOLOGY

FIELD OF THE INVENTION

The present invention relates to a method for distributing video information to a mobile phone based on push technology, and in particular to a method for distributing video information to a mobile phone based on push technology via a network. The invention is based on a priority application JP 2003-106492 which is hereby incorporated by reference.

PRIOR ART

A data service through a mobile phone (a mobile terminal) connected to a radio communication network presently has a mail system mainly constituted by transmission/reception of character data as a principal function. In recent years, however, a function of the mobile phone has been remarkably improved so that a mobile phone, which allows transmission/reception of video information, has been developed and spreading of such a mobile phone has started.

However, the fact is that video information service presently available is mainly constituted by transmission/reception of video information between specific users, monitoring for a remote area or the like and services utilizing functions of a new mobile phone sufficiently are not so much provided.

Particularly, regarding a distribution service of video information based on push technology, i.e., a service aspect of performing distribution of video information from a video contents server to contracted user (client) based on push technology, there is no proposal worth talking about, but a service of an aspect that, when a user preliminarily registered that the user makes a request for video information distribution service about a specific genre to a service provider, the video information of the specific genre is distributed base on push technology from a video contents server of the service provider to a mobile phone of the user has been merely implemented.

Incidentally, information on a conventional art relating to a method for distributing video information to a mobile phone based on push technology according to the present invention is described in details, for example, in ["W-CDMA mobile communication system" supervised by Keiji TACHIKAWA, and published on Jun. 25, 2001; Publisher: MARUZEN CO, .LTD.].

[Non-Patented Document 1]
"W-CDMA mobile communication system" supervised by Keiji TACHIKAWA, and published on Jun. 25, 2001; Publisher: MARUZEN CO, .LTD.

Problem to be Solved by the Invention

An object of the present invention is to provide a novel method for distributing video information to a mobile phone based on push technology which can utilize functions of a new mobile phone sufficiently. In particular, an object of the present invention is to provide a method for distributing video information about a specific area to a mobile phone based on push technology when a user of the mobile phone exists in the specific area, a method for distributing video information to a mobile phone based on push technology when traffic of a radio channel connected to the mobile phone is lower than a predetermined threshold, and a method for distributing video information about a specific area to a mobile phone based on push technology when a user of the mobile phone exists in the specific area and when traffic of a radio channel connected to the mobile phone is lower than a predetermined threshold.

Means for Solving Problem

A method for distributing video information to a mobile phone based on push technology according to claim 1 of the present invention comprises: a step of registering that a user makes a request for a video information distribution service about a specific area to the user management server in advance; a step of detecting that the mobile phone carried by the user exists in the specific area; and a step of, when it has been detected that the mobile phone exists in the specific area, distributing the video information about the specific area from the video contents server to the mobile phone based on push technology.

In the invention according to claim 1 with such a constitution, when the user exists in the specific area, for example, the video information of commercial, guidance or the like about the specific area can be distributed to the user.

Further, a method for distributing video information to a mobile phone based on push technology according to claim 2 of the present invention comprises: a step of registering that a user makes a request for a video information distribution service to the user management server in advance; a step of detecting traffic of a radio channel connected to the mobile phone carried by the user; and a step of, when the detected traffic is lower than a predetermined threshold, distributing video information from the video contents server to the mobile phone based on push technology.

In the invention according to claim 2 with such a constitution, the user management server can provide video information to the user securely at a selected timing when congestion has been reduced in a network. Further, since an unoccupied resource can be utilized effectively, the video information distribution service based on push technology can be provided to the user at a low charge.

Further, a method for distributing video information to a mobile phone based on push technology according to claim 3 of the present invention comprises: a step of registering that a user makes a request for a video information distribution service about a specific area to the user management server in advance; a step of detecting that the mobile phone carried by the user exists in the specific area; a step of detecting traffic of a radio channel connected to the mobile phone at a time when it has been detected that the mobile phone exists in the specific area; and a step of, when the detected traffic is lower than a predetermined threshold, distributing video information about the specific area from the video contents server to the mobile phone based on push technology.

In the invention according to claim 3 with such a constitution, the user management server can securely distribute, for example, the video information of commercial, guidance or the like about the specific area to the user at a selected timing when congestion has been reduced in the network. Further, since an unoccupied resource can be used effectively, the video information distribution service based on push technology can be provided to the user at a low charge.

Furthermore, a method for distributing video information to a mobile phone based on push technology according to claim 4 of the present invention comprises: a step of, when video information is distributed from the video contents server to the mobile phone based on push technology while a user is using the mobile phone, causing the mobile phone to save the video information distributed to the mobile phone; a step of, when video information is distributed from the video contents server to the mobile phone based on push technology while the user is not using the mobile phone, causing the mobile phone to display the video information distributed to the mobile phone for only a predetermined time period, and thereafter causing the mobile phone to stop displaying the video information and causing the mobile phone to save the remaining video information distributed after the predetermined time period has elapsed; and a step of causing the mobile phone to display the saved video information on the basis of a user's instruction.

According to this aspect, in case that, because the user is using the mobile phone, even when video information is distributed from the video contents sever to the mobile phone based on push technology, the user can not see the distributed video information, the distributed video information is saved and thereafter the user can see the saved video information when the user is in a situation that the user can see the video information. Further, in case that, because the user is not using the mobile phone, when video information is distributed from the video contents server to the mobile phone based on push technology, the user can see the distributed video information for only a predetermined time period, but displaying the distributed video information is restricted within the predetermined time in order to prevent the function of the mobile phone from be occupied with displaying the distributed video information. After the predetermined time has elapsed, the remaining distributed video information is saved, and thereafter the user can see the saved remaining video information as desired.

As mentioned above, it is made possible to utilize a new feature of the mobile phone of a mobile communication system to provide a mail service function using video information (that is, a mail service function obtained by developing the conventional mail service function using characters).

EMBODIMENTS OF THE INVENTION

Embodiments of the method for distributing video information to a mobile phone based on push technology of the present invention will be explained in detail below with reference to the drawings.

FIG. 1 is a configuration diagram showing an entire constitution of a system for realizing the method for distributing video information to a mobile phone based on push technology according to the present invention.

In FIG. 1, the system realizing the method for distributing video information to a mobile phone based on push technology according to the present invention is provided with a video contents server 1 which stores therein the video information to be distributed, a user management server 2 which controls registration of a user who makes a request for video information distribution service to be provided and video information distribution, a mobile phone 5 carried by the user, a traffic monitoring apparatus 3 which detects traffic of a radio channel connected to the mobile phone 5, and an audio automatic responding apparatus 4 used in case that a service for pre-registration of the user is conducted according to an audio guidance.

Further, the system for realizing the method for distributing video information to a mobile phone based on push technology according to the present invention includes an Internet network 10, a PSTN (Public Switched Telephone Network) 20 of an analog type telephone network, a CN (PS) 30 constituting a packet switching function in a core network, a CN (CS) 40 constituting a line switching function in the core network, and a UTRAN 50 of a radio access network as constituent elements for a network.

The UTRAN 50 may be an existing ordinary RAN (Radio Access Network), or may be a UTRAN (that is, UMTS (Universal Radio Access Network) which is RAN of the third generation: a terrestrial radio access network).

Functions of the system for realizing the distribution method based on push technology will be explained below for each constituent element.

When new video information is registered, the video contents server 1 notifies registration of the new video information to the user management server 2 and distributes video information to the mobile phone 5 carried by the user via the Internet network 10, the CN (PS) 30 or the CN (CS) 40, and the UTRAN 50 at a timing when the video contents server 1 has received a distribution instruction from the user management server 2. As the distribution route for the video information, there are two routes of a route passing through the CN (PS) 30 and a route passing through the CN (CS) 40, and which route should be selected is instructed by the user management server 2 on the basis of the distribution route registered by the user.

The user management server 2 receives registration from a user to conduct a contract service with the user and a user registration, and controls distribution of the video information to the contracted user (client). Incidentally, one of a method where user registration is performed by user's response to the audio guidance via the UTRAN 50, the CN (CS) 40 and the PSTN 20 of the general analog type telephone network and a method where user registration is performed by user's connection to a homepage of WWW provided by the user management server 2 via the UTRAN 50 and the CN (PS) 30 can be employed for contract service with the user at a time of contract.

The traffic monitoring apparatus 3 acquires a position information of a cell in which the mobile phone 5 exists from the CN (PS) 30 or the CN (CS) 40 via the Internet network 10 on the UTRAN 50 to detect traffic of the radio channel connected to the mobile phone 5.

The audio automatic responding apparatus 4 allows a user to use the mobile phone 5 to make a contract according to the audio guidance when the user management server 2 conducts a pre-registration service with the user of the mobile phone 5. The response according to the audio guidance is made via the PSTN 20 of the general analog type telephone network, the CN (CS) 40 and the UTRAN 50.

The mobile phone 5 is first used as input/output means of data for performing user registration between the user and the user management server 2, and is also used as receiving means of video information which accepts distribution service of video information from the video contents server 1 after the contract. The received video information can be displayed on an unillustrated display screen in real time and can be stored and saved in an unillustrated storage apparatus.

FIG. 2 to FIG. 5 are flowcharts for explaining an operation of the system for realizing the method for distributing video information to a mobile phone based on push technology of a first embodiment according to the present invention.

Here, an operation performed after the user has registered that the user makes a request for a video distribution service about a specific area to the user management server 2 in advance will be shown.

In FIG. 2, first, the CN (CS) 40 detects whether or not the mobile phone 5 has entered in the specific area (a specific contract area in which the user makes a request for the video information distribution service) (Step S1). When the mobile phone 5 has not entered in the specific area yet, the CN (CS) 40 continues monitoring. Further, when the mobile phone 5 has entered in the specific area, the CN (CS) 40 transmits an existence notification to the user management server 2 via the Internet network 10.

The user management server 2 receives the existence notification and verifies whether or not the video information about the specific area indicated on the existence notification has been already distributed to the mobile phone 5 of the contract user (Step S2). When the video information has been already distributed, the user management server 2 terminates the processing as it is. Further, when the information has not been distributed yet, the user management server 2 proceeds to an operation shown in FIG. 3.

In FIG. 3, the user management server 2 makes preparation of video information distribution (Step S11). The preparation includes taking-out of a telephone number of the mobile phone 5 of the user, which is a distribution destination, or information indicating that the route for distributing video information is the PS service or the CS service.

Next, the user management server 2 verifies whether or not the designation of the distribution method contracted at a time of registration was the PS service (namely the designation of distribution via the CN (PS) 30) (Step S12). Unless the PS service was designated, the user management service 2 proceeds to Step S14. When the distribution via the PS service was designated, the user management server 2 transmits a distribution instruction to the video contents server 1 so as to distribute video information about the specific area to the mobile phone 5 of the user as the PS service in Step S13, and receives a response from the video contents server 1 to terminate the processing. Incidentally, a specific operation of the video contents server 1 when the video contents server 1 has received the instruction of the PS service will be shown in FIG. 4.

In Step S14, the user management server 2 transmits a distribution instruction to the video contents sever 1 so as to distribute video contents about the specific area to the mobile phone 5 of the user as the CS service (namely, the designation of distribution via the CN (CS) 40), and receives a response from the video contents server 1 to terminate the processing. Incidentally, a specific operation of the video contents server 1 when the video contents server 1 has received the instruction of the CS service will be shown in FIG. 5.

In FIG. 4, the video contents server 1 prepares distribution of the video information about the specific area to the mobile phone 5 of the user via the PS service (Step S21). The video contents server 1 transmits the video information to the mobile phone 5 of the user via the Internet network 10 (Step S22). Incidentally, thereafter, the video contents server 1 performs response to the user management server 2 (not shown).

In FIG. 5, the video contents server 1 makes preparation of the video information distribution (Step S31). The video contents server 1 performs line connection with the PSTN 20 (Step S32). Upon this, the PSTN 20 performs line connection with the CN (CS) 40 and the CN (CS) 40 performs line connection with the UTRAN 50 (Step S33). Thereafter, the UTRAN 50 performs line connection with the mobile phone 5 (not shown). Thereby, a line between the video contents server 1 and the mobile phone 5 of the contract user is connected to obtain a calling connection state (Step S34). Next, the video contents server 1 transmits the video information about the specific area to the PSTN 20 (Step S35). Further, the PSTN 20 transmits the video information to the CN (CS) 40 (Step S36). Furthermore, the CN (CS) 40 transmits the video information to the UTRAN 50 (Step S37). Finally, the UTRAN 50 transmits the video information to the mobile phone 5 of the contract user (not shown). When the distribution of the video information to the mobile phone 5 has been completed, the calling connection is disconnected (Step S38). Incidentally, thereafter, the video contents server 1 responds to the user management server 2 (not shown).

According to this first embodiment, when the mobile phone 5 carried by the user exists in registered specific area where the user makes a request for a video information distribution service to be provided, the video information about the registered specific area is distributed from the video contents server 1, so that the user can be distributed with, for example, the video information of commercial, guidance or the like regarding the specific area when the user exists in the specific area.

FIG. 6a is a flowchart for explaining operation of the mobile phone at a time of saving the video information in the system for realizing the method for distributing video information to a mobile phone based on push technology according to the present invention, and FIG. 6b is a flowchart for explaining an operation of the mobile phone at a time of reproducing the video information.

In FIG. 6a, when the mobile phone 5 is distributed with video information based on push technology, verification is made about whether or not the mobile phone 5 is being used (Step S41). In case that the mobile phone 5 is being used by the user, the received video information is saved immediately (Step S43). Further, in case that the mobile phone 5 is not being used by the user, the distributed video information is displayed for only a predetermined time period (Step S42). In case that the distribution of the video information is continued even after the predetermined time period has elapsed, displaying the video information is stopped and the remaining video information distributed after the predetermined time period has elapsed is saved (Step S44). Thereafter, in case that the user desires to see the remaining video information, the user can reproduce and see the saved remaining video information according to an operation at the time of reproducing the video information shown in FIG. 6b.

As a constitution other than that of this embodiment, for example, such a constitution can be employed that a user can continuously see the distributed video information even after the predetermined time period has elapsed in preference to the telephone function, or such a constitution can be employed that the distributed video information is always saved without displaying the video information at a time of distribution, such a constitution can be employed that a user can stop seeing the distributed video information even if the predetermined time has not elapsed yet, or such a constitution can be employed that an incoming calling is received while the distributed video information is being displayed, displaying the video information is stopped to perform the telephone function and the remaining video information received after stopping the display is saved.

In FIG. 6b, the mobile phone 5 verifies whether or not actuation of the reproducing function is designated by the user (Step S45). In case that the actuation of the reproducing function is not designated, the mobile phone 5 is on standby until the reproducing function is designated by the user, and when the actuation of the reproducing function is designated, the mobile phone 5 actuates the reproducing function for the saved video information (Step S46).

A system for realizing a method for distributing video information to a mobile phone based on push technology of a second embodiment according to the present invention has the same constitution as the system of the first embodiment of the present invention except that the traffic monitoring apparatus 3 is an essential constituent element, and only a distribution condition of video information from the video contents server 1 is different from the first embodiment.

FIG. 7 and FIG. 8 are flowcharts showing an operation of the system for realizing the method for distributing video information to a mobile phone based on push technology of the second embodiment according to the present invention.

Here, an operation performed after the user pre-registered that the user makes a request for a video information distribution service to the user management server 2 is shown.

In FIG. 7, first, when the video contents server 1 receives new video information from an external server, the video contents server 1 makes registration for the information (Step S51). Next, the video contents server 1 verifies whether or not the registration of the new video information has been notified to the user management server 2 (Step S52). Unless the registration has been notified, the video contents server 1 notifies the registration to the user management server 2. Further, if the notification has been completed, the processing proceeds to Step S53. The user management server 2 verifies whether or not it has received a registration notification of the new video information from the video contents server 1, and it is on standby until it receives the registration notification of the new video information (Step S61). When receiving the registration notification of the video information, after the user management server 2 returns a notification response to the video contents server 1, the user management server 2 transfers a flow of control of the video contents server 1 to Steps S53. Thereafter, the user management server 2 prepares video information distribution (Step S62).

After execution of Step S62, the user management sever 2 verifies whether or not the contract content of the registered video information was "PS service" (Step S63). Unless the contract content was "PS service", the user management server 2 proceeds to Step S71 (FIG. 8). Further, when the contract content was "PS service", the user management server 2 transmits a position information acquiring request of the mobile phone 5 to the CN (PS) 30 via the Internet network 10 (Step S64) to acquire the position information of the mobile phone 5. Next, the user management server 2 transmits a traffic information acquiring request based upon the acquired position information of the mobile phone 5 to the traffic monitoring apparatus 3 (Step S65) to acquire traffic information of a radio channel connected to the mobile phone 5.

Next, the user management server 2 verifies whether or not the traffic of the ratio channel connected to the mobile phone 5 is a predetermined threshold or less on the basis of the acquired traffic information (Step S66). Unless the traffic is the predetermined threshold or less, the user management server 2 proceeds to Step S75 (FIG. 8). Further, when the traffic is the predetermined threshold or less, the user management server 2 sends "PS distribution instruction (for each user of distribution destination)" to the video contents server 1 (Step S67).

In Step 71, the user management server 2 transmits the position information acquiring request of the mobile phone 5 to the CN (CS) 40 via the Internet network 10 to acquire the position information of the mobile phone 5. Next, the user management server 2 transmits a traffic information acquiring request based upon the acquired position information of the mobile phone 5 to a traffic monitoring apparatus 3 (Step S72) to acquire traffic information of the radio channel connected to the mobile phone 5.

Next, the user management server 2 verifies whether or not the traffic of the radio channel connected to the mobile phone 5 is a predetermined threshold or less on the basis of the acquired traffic information (Step S73). Unless the traffic is the predetermined threshold or less, the user management server 2 proceeds to Step S75. Further, when the traffic is the predetermined threshold or less, the user management server 2 sends "CS distribution instruction (for each user of distribution destination)" to the video contents server 1 (Step S74).

In Step S75, the user management server 2 verifies whether or not distribution of video information to all users has been completed. When the distribution has not been completed yet, the user management server 2 returns back to Step S63 (FIG. 7). Further, when the distribution has been completed, the user management server 2 returns back to Step S61 (FIG. 7).

In Step S53, the video contents server 1 is on standby until it receives the notification response, and when the video contents server 1 receives the notification response and receives "PS distributing instruction (for each user of distributing destination)" from the user management server 2, the video contents server 1 performs PS distribution of video information, or when the video contents server 1 receives "CS distribution instruction (for each user of distributing destination)" from the user management server 2, it performs CS distribution of video information. The video contents server 1 returns these responses (for each user of distributing destination) to the user management server 2. Since a specific operation of the PS distribution is the same as that of the first embodiment shown in FIG. 4, and a specific operation of the CS distribution is similarly the same as that of the first embodiment shown in FIG. 5, explanation thereof will be omitted herein.

According to the second embodiment, the user management server 2 acquires the position information of the mobile phone 5 carried by the user from the CN (CP) 30 or the CN (CS) 40 and further acquires the traffic at a time of actuation of video distribution in the radio channel connected to the mobile phone 5 from the traffic monitoring apparatus 3 on the basis of the position information, and the user management server 2 can distribute the video information from the video contents server 1 based on push technology only when the traffic is the predetermined traffic threshold or less, so that the video information can securely be provided to the user at selected timing when congestion has been reduced in the network.

A system for realizing a method for distributing video information to a mobile phone based on push technology of a third embodiment according to the present invention has the same constitution as the system for realizing the method for distributing video information to a mobile phone based on push technology of the first embodiment of the present invention except that the traffic monitoring apparatus 3 is an essential constituent element, and only a distribution condition of video information from the video contents server 1 is different from the first embodiment.

FIG. 9 to FIG. 11 are flowcharts showing an operation of a system for realizing the method for distributing video information to a mobile phone based on push technology of the third-embodiment according to the present invention.

Here, an operation performed after the user pre-registered that the user makes a request for a video information distribution service about the specific area to the user management server 2 is shown.

In FIG. 9, first, the CN (CS) 40 detects whether or not the mobile phone 5 has entered in the specific area (a specific contact area where a user makes a request for the video information distribution service to be provided) (Step S81). Unless the mobile phone 5 has entered in the specific area, the CN (CS) 40 continues monitoring. When the mobile phone 5 has entered in the specific area, the CN (CS) 40 transmits an existence notification to the user management server 2 via the Internet network 10.

The user management server 2 receives the existence notification and verifies whether or not the video information about the specific area indicated in this existence notification has been already been distributed to the mobile phone 5 of the contract user (Step S82). When the distribution has been already completed, the user management server 2 terminates the processing as it is. When the distribution has not been completed yet, the user management server 2 proceeds to an operation shown in FIG. 10 to prepare a distribution instruction of video information (Step S83).

After execution of Step S83, the user management server 2 verifies whether or not the contract content of the registered video information was "PS service" (Step S84). Unless the contract content was "PS service", the user management server 2 proceeds to Step S91 (FIG. 11).

Further, when the contact content was "PS service", the user management server 2 transmits a position information acquiring request of the mobile phone 5 to the CN (PS) 30 via the Internet network 10 (Step S85) to acquire the position information of the mobile phone 5. Next, the user management server 2 transmits a traffic information acquiring request to the traffic monitoring apparatus 3 on the basis of the acquired position information of the mobile phone 5 (Step S86) to acquire traffic information of a radio channel connected to the mobile phone 5.

Next, the user management server 2 verifies whether or not the traffic of the radio channel connected to the mobile phone 5 is a predetermined threshold or less on the basis of the acquired traffic information (Step S87). Unless the traffic is the predetermined threshold or less, the user management server 2 terminates the processing.

Further, when the traffic is the predetermined threshold or less, the user management server 2 sends "PS distribution instruction (for each user of distribution destination)" to the video contents server 1 (Step S88).

In FIG. 11, the user management server 2 transmits a position information acquiring request of the mobile phone 5 to the CN (CS) 40 via the Internet network 10 to acquire the position information of the mobile phone 5 in Step 91. Next, the user management server 2 transmits a traffic information acquiring request to the traffic monitoring apparatus 3 on the basis of the acquired position information of the mobile phone 5 (Step S92) to acquire traffic information of a radio channel connected with the mobile phone 5.

Next, the user management server 2 verifies whether or not the traffic of the radio channel connected to the mobile phone 5 is a predetermined threshold or less on the basis of the acquired traffic information (Step S93). Unless the traffic is not the predetermined threshold or less, the user management server 2 terminates the processing. When the traffic is the predetermined threshold or less, the user management server 2 sends "CS distribution instruction (for each user of distribution destination)" to the video contents server 1 (Step S94).

On the other hand, the video contents server 1 performs a PS distribution of video information at a timing when it has received "PS distribution instruction (for each user of distribution destination)" from the user management server 2, or it performs a CS distribution of video information at a timing when it has received "CS distribution instruction (for each user of distribution destination)", and return a response thereof (for each user of distribution destination) back to the user management server 2. Incidentally, since a specific operation of the PS distribution is the same as that of the first embodiment shown in FIG. 4, and a specific operation of the CS distribution is similarly the same as that of the first embodiment shown in FIG. 5, explanation thereof will be omitted herein.

According to this third embodiment, when the mobile phone carried by the user exists in registered specific area where the user makes a request for the video information distribution service to be provided and the traffic of the radio channel connected to the mobile phone carried by the user is lower than the predetermined threshold, video information about the specific area is distributed from the video contents server to the mobile phone based on push technology, so that the user can securely be distributed with, for example, video information of commercial, guidance or the like regarding the specific area when the user exists in the specific area at a timing when congestion has been reduced in the network. Further, since an unoccupied resource can be used effectively, the video information distribution service based on push technology can be provided to the user with a low charge.

Advantage of the Invention

As explained above, according to the method for distributing video information to a mobile phone based on push technology of the present invention, when the mobile phone carried by the user exists in registered specific area where the user makes a request for a video information distribution service to be provided, video information about the registered specific area is distributed from the video contents server, so that the user can be distributed with, for example, video information of commercial, guidance or the like regarding the specific area.

Further, when traffic of a radio channel connected to the mobile phone carried by the user is lower than the predetermined threshold, video information is distributed from the video contents server to the mobile phone based on push technology, so that the video contents can securely be provided to the user at a selected timing when congestion has been reduced in the network. Furthermore, since an unoccupied resource can effectively be used, the video information distribution service based on push technology can be provided to the user with a low charge.

Furthermore, when the mobile phone carried by the user exists in registered specific area where the user makes a request for a video information distribution service to be provided and the traffic of the radio channel connected to the mobile phone carried by the user is lower than the predetermined threshold, video information about the specific area is distributed from the video contents server to the mobile phone based on push technology, so that the user can securely be distributed with, for example, video information of commercial, guidance or the like about the specific area when the user exists in the specific area at a selected timing when congestion has been reduced in the network. Further, since an unoccupied resource can be used effectively, the video information distribution service based on push technology can be provided to the user with a low charge.

Moreover, in case that the user is using a mobile phone, and even when video information is distributed from the video contents sever to the mobile phone based on push technology, the user can not see the distributed video information, the distributed video information is saved and thereafter the user can see the saved video information when the user is in a situation that the user can see the video information. Further, in case that the user is not using the mobile phone, and when video information is distributed from the video contents server to the mobile phone based on push technology, the user can see the distributed video information for only a predetermined time period, but displaying the distributed video information is restricted within the predetermined time in order to prevent the function of the mobile phone from be occupied with displaying the distributed video information. After the predetermined time has elapsed, the remaining distributed video information is saved, and thereafter the user can see the saved remaining vide information, as desired.

According to the above advantage, it is made possible to utilize the features of the mobile phone of the new mobile communication system to provide a mail service function using video information (that is, a mail service function obtained by developing the conventional mail service function using characters).

Figure 1:
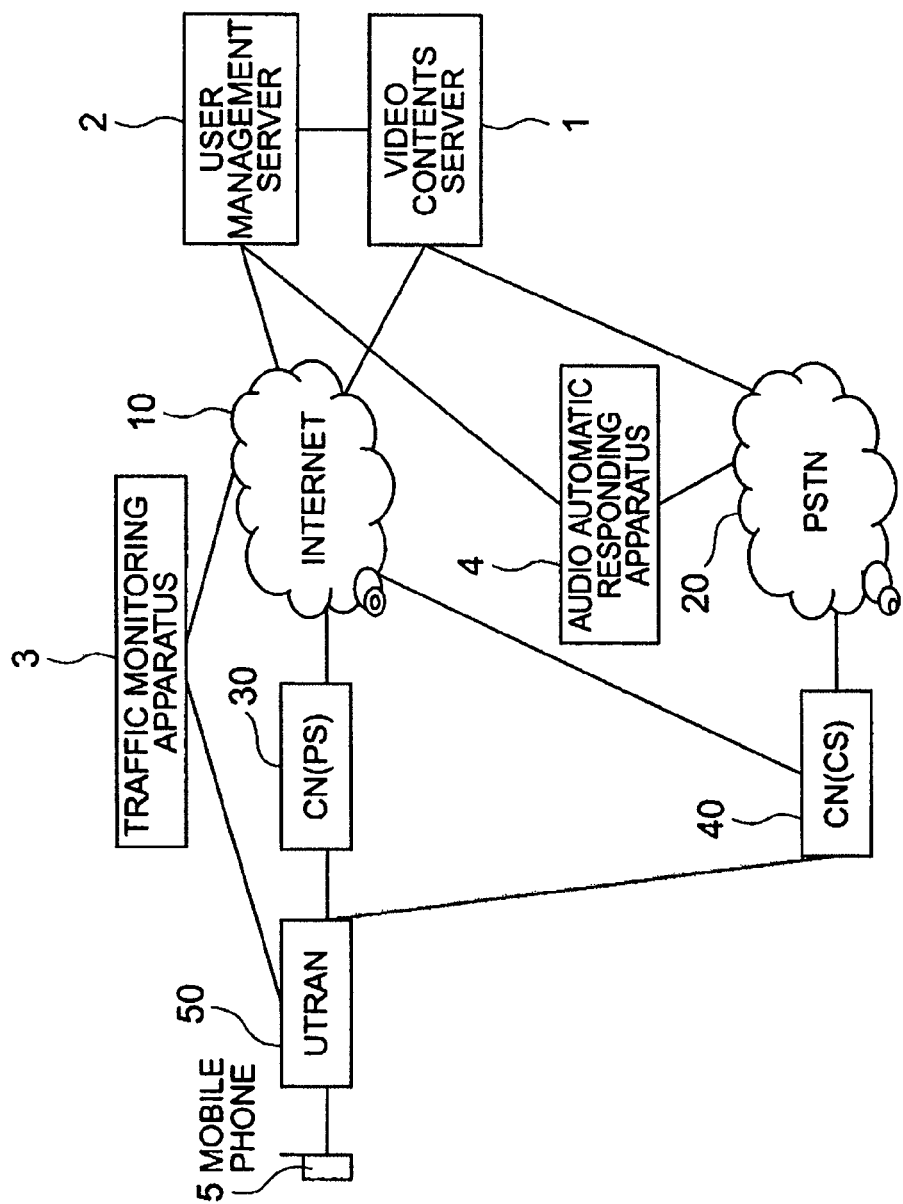
FIG. 1 is configuration diagram showing the entire constitution of a system for realizing a method for distributing video information to a mobile phone based on push technology of a first embodiment according to the present invention.
Figure 2:
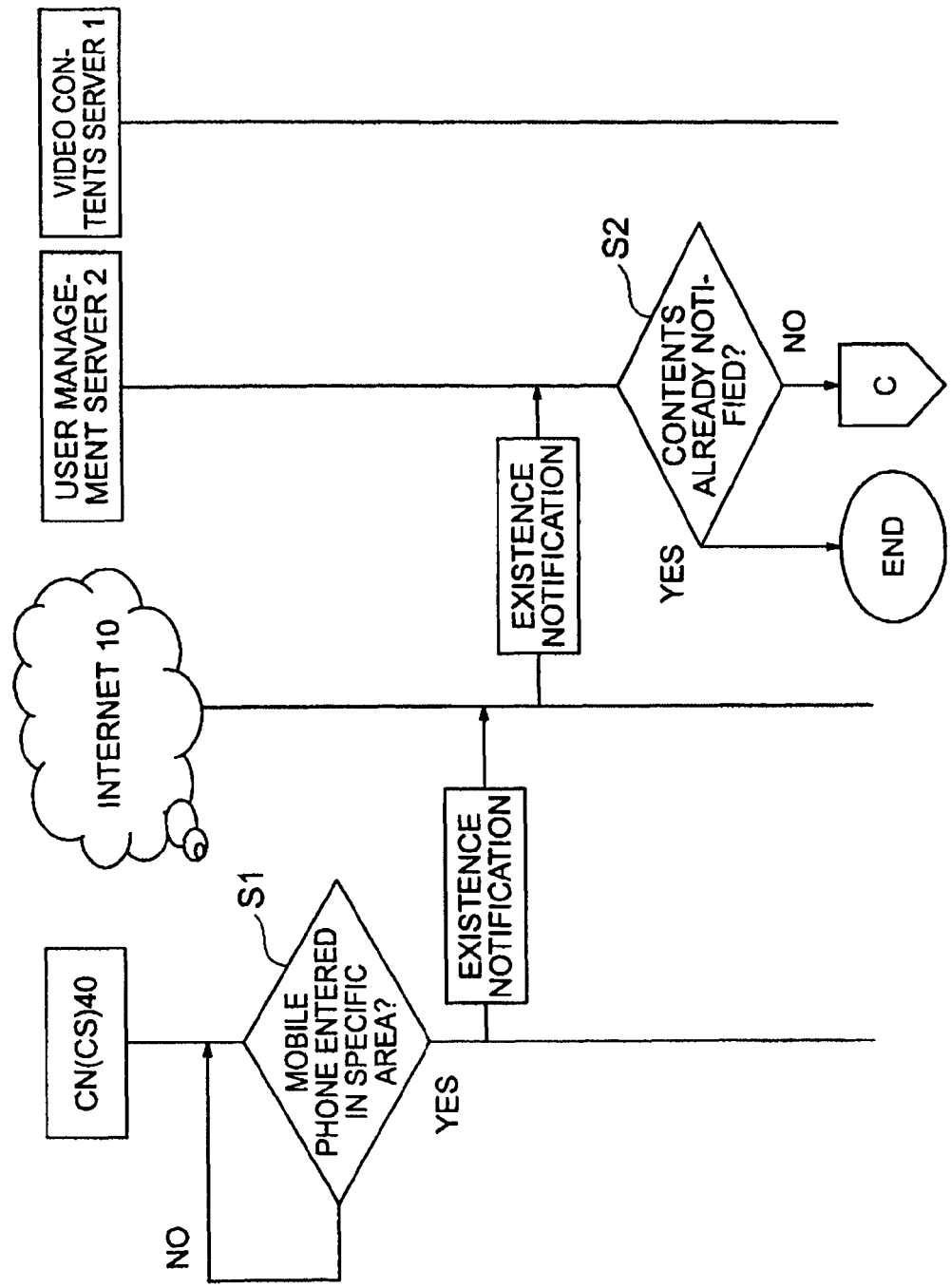
FIG. 2 is a portion of a flowchart for explaining an operation of the system for realizing a method for distributing video information to a mobile phone based on push technology of the first embodiment according to the present invention.
Figure 3:
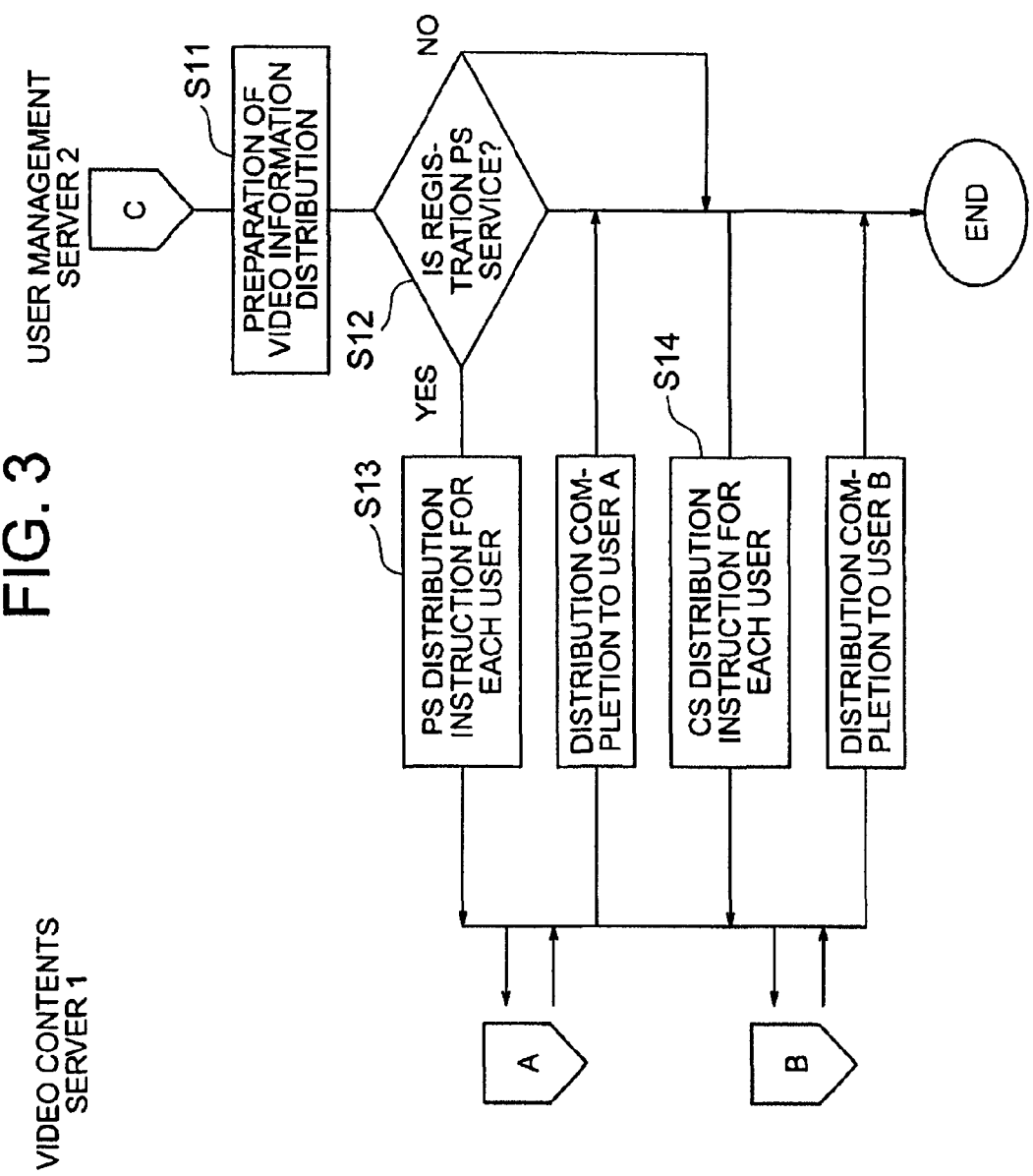
FIG. 3 is a portion of a flowchart for explaining an operation of the system for realizing a method for distributing video information to a mobile phone based on push technology of the first embodiment according to the present invention.
Figure 4:
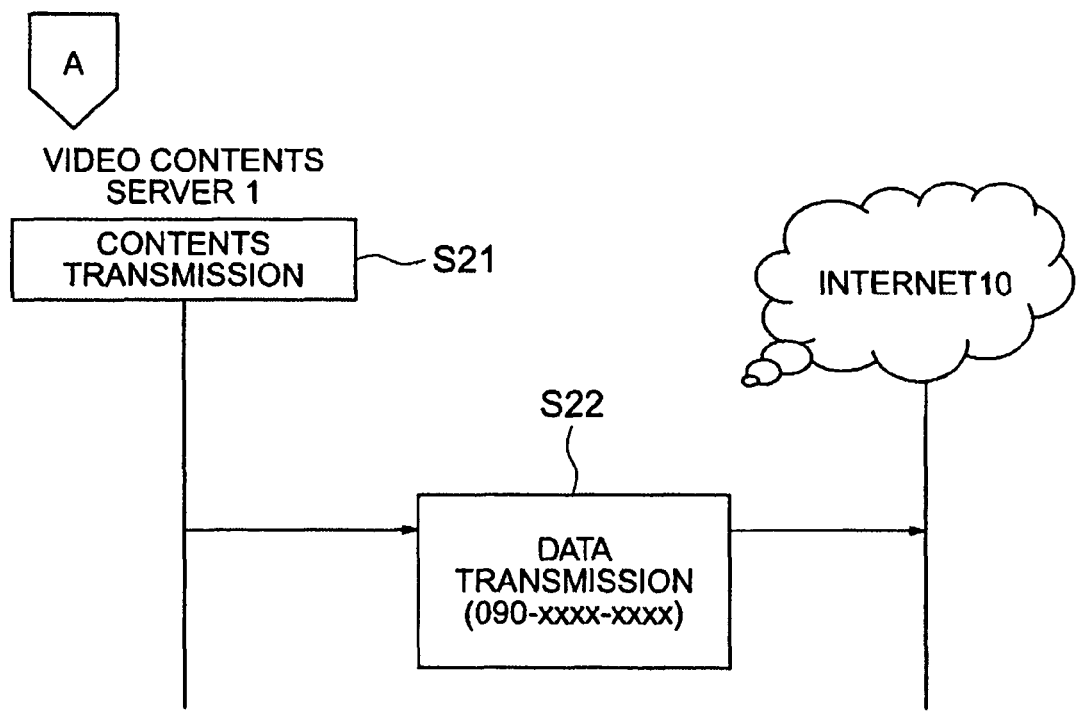
FIG. 4 is a portion of a flowchart for explaining an operation of the system for realizing a method for distributing video information to a mobile phone based on push technology of the first embodiment according to the present invention.
Figure 5:
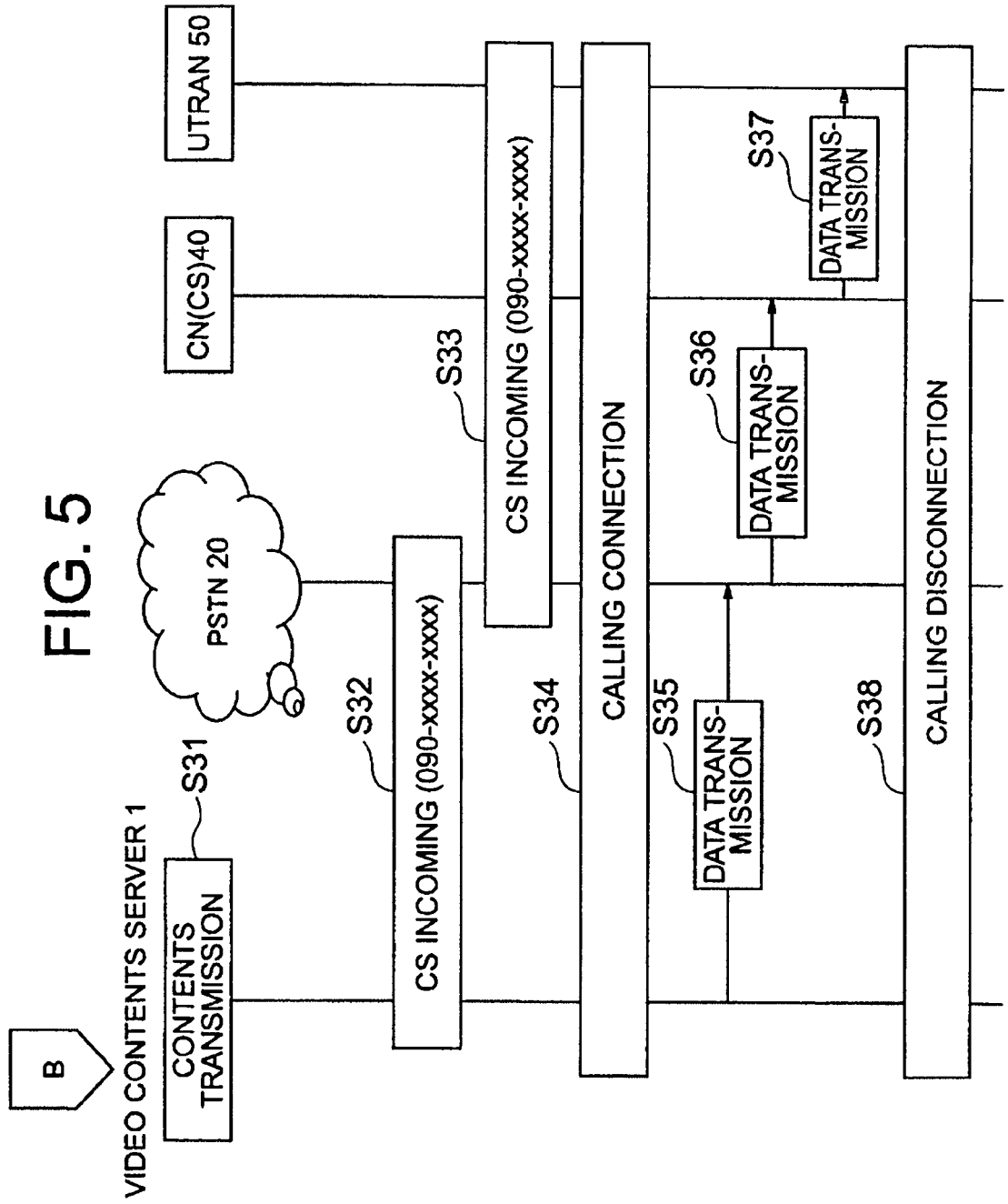
FIG. 5 is a portion of a flowchart for explaining an operation of the system for realizing a method for distributing video information to a mobile phone based on push technology of the first embodiment according to the present invention.
Figure 6:
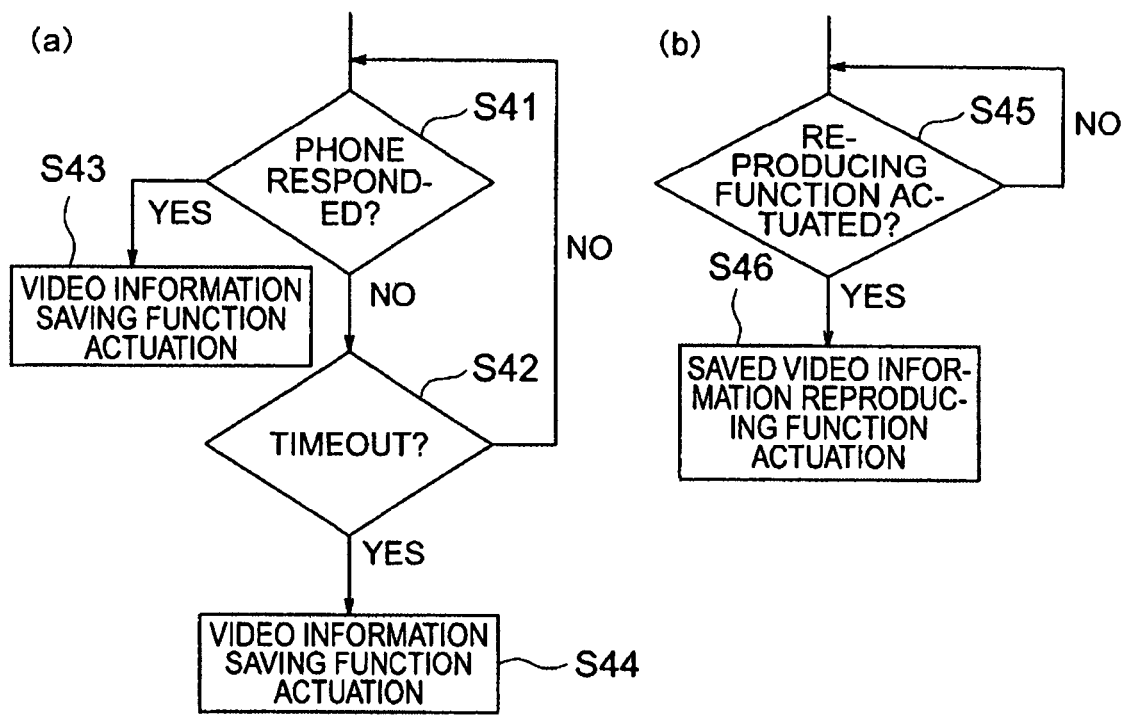
FIG. 6a is a flowchart for explaining an operation at a saving time of video information in a mobile phone of the system for realizing a method for distributing video information to a mobile phone based on push technology according to the present invention.
FIG. 6b is a flowchart showing an operation at a reproducing time of video information in a mobile phone of the system for realizing a method for distributing video information to a mobile phone based on push technology according to the present invention.
Figure 7:
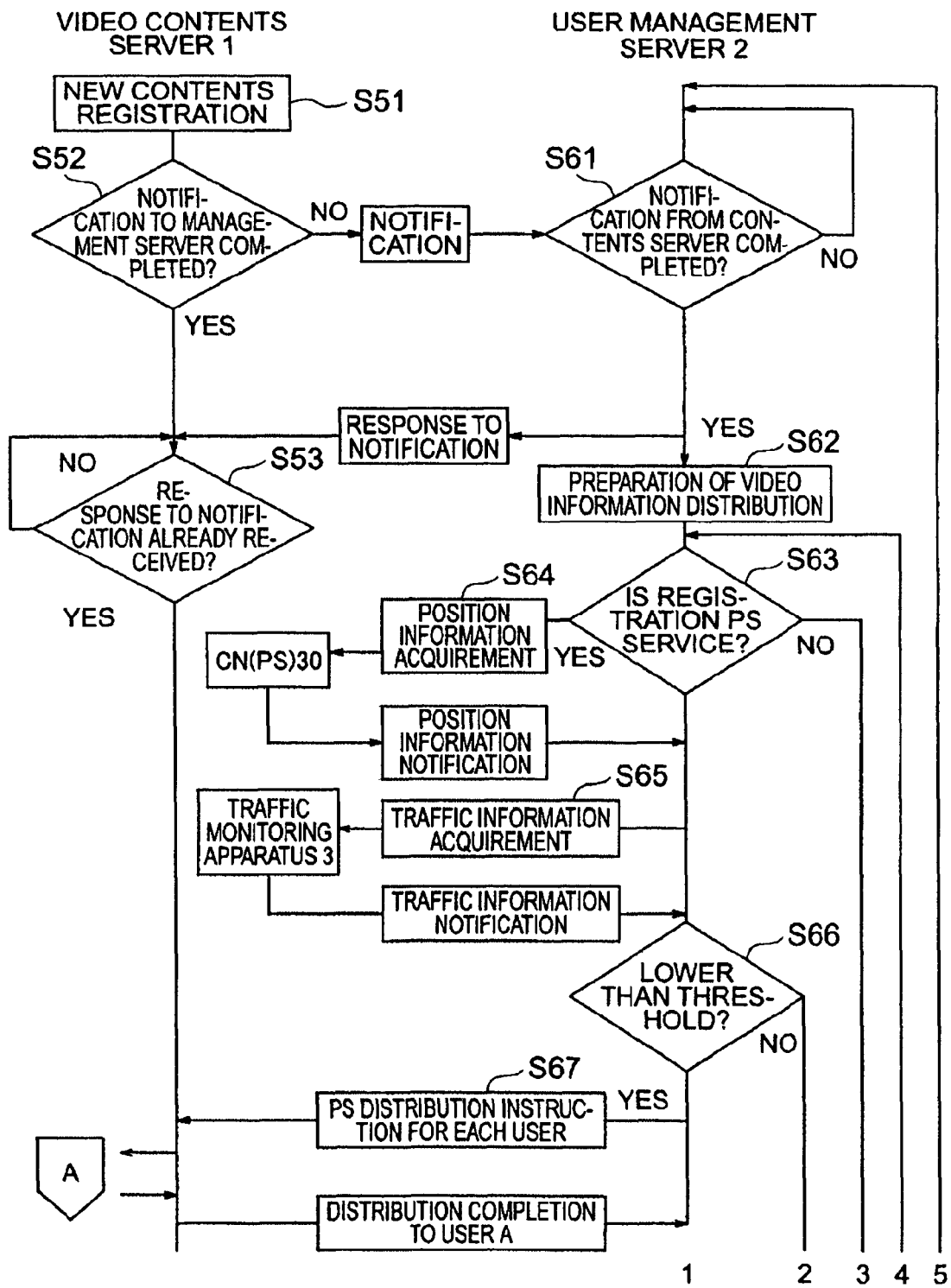
FIG. 7 is a portion of a flowchart showing an operation of a system for realizing a method for distributing video information to a mobile phone based on push technology of a second embodiment according to the present invention.
Figure 8:
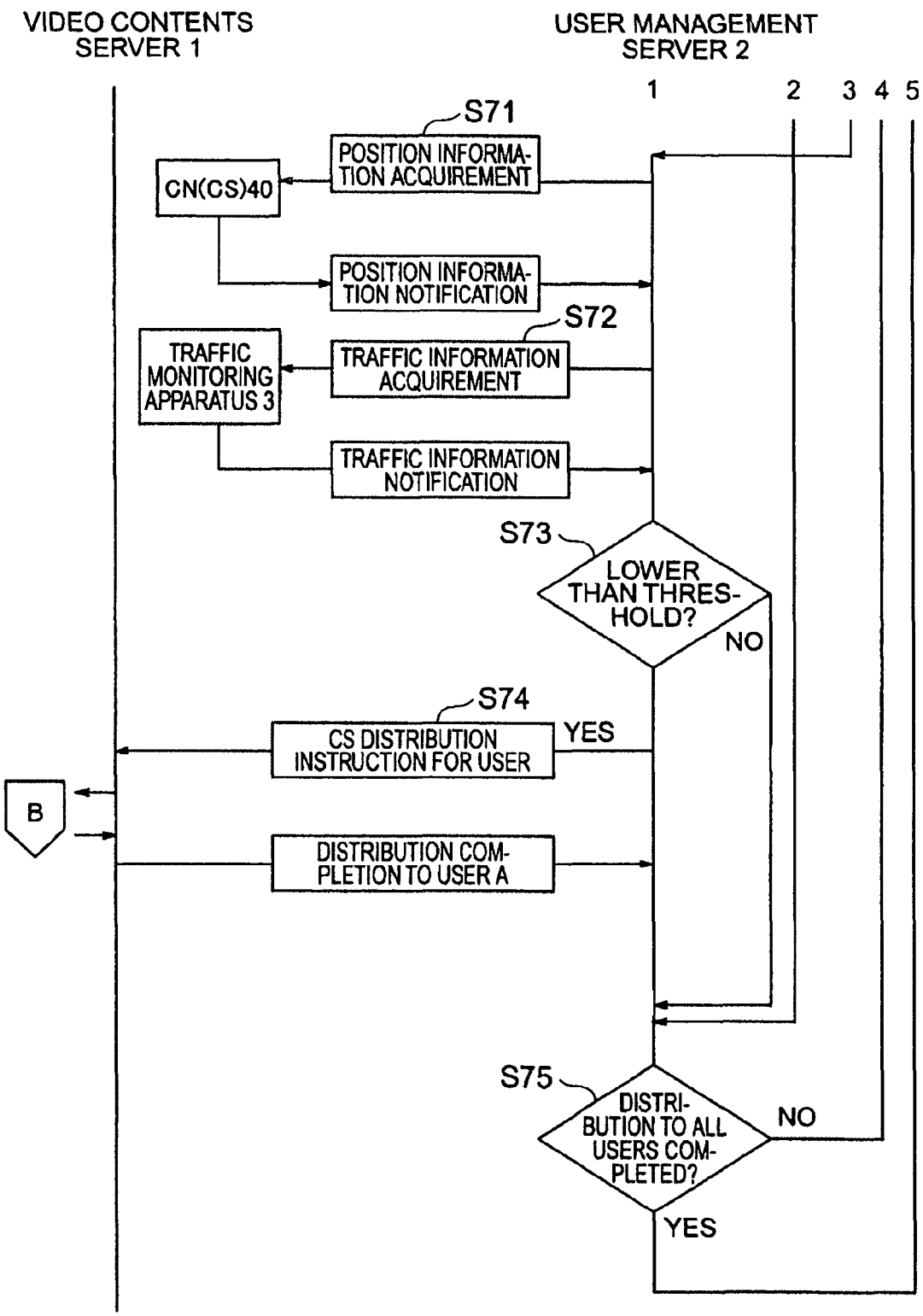
FIG. 8 is a portion of a flowchart showing an operation of the system for realizing a method for distributing video information to a mobile phone based on push technology of the second embodiment according to the present invention.
Figure 9:
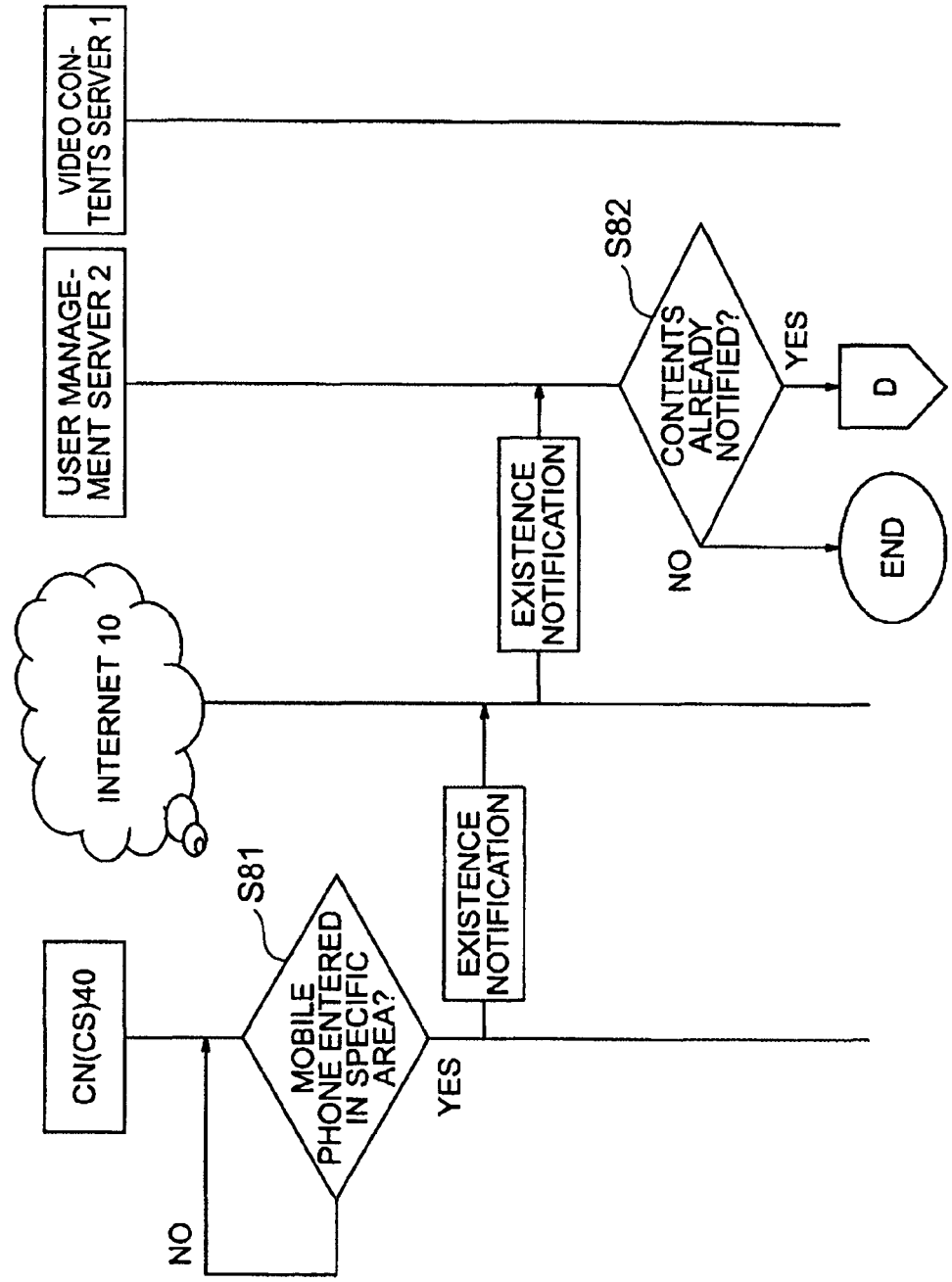
FIG. 9 is a portion of a flowchart showing an operation of a system for realizing a method for distributing video information to a mobile phone based on push technology of a third embodiment according to the present invention.
Figure 10:
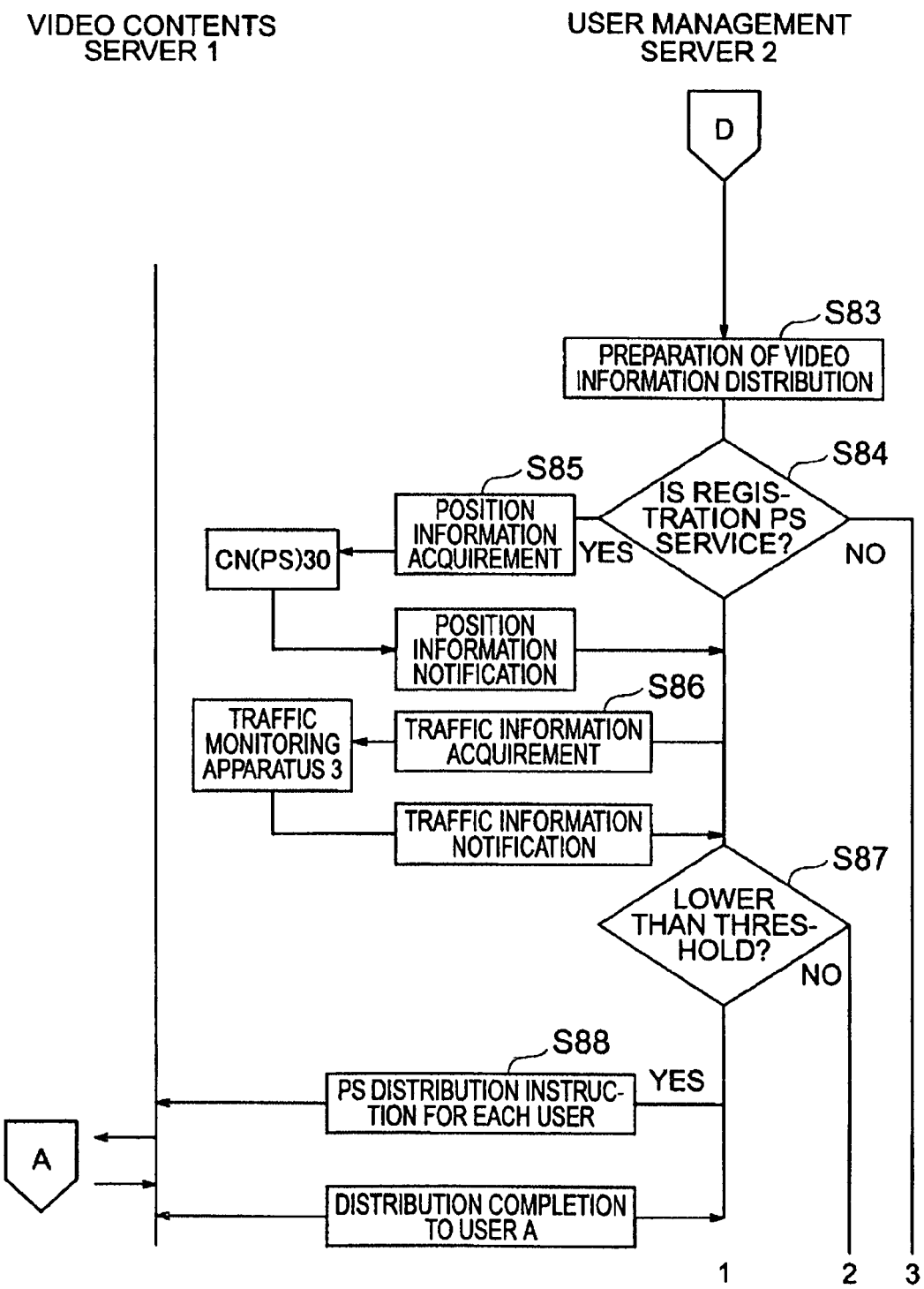
FIG. 10 is a portion of a flowchart showing an operation of the system for realizing a method for distributing video information to a mobile phone based on push technology of the third embodiment according to the present invention.
Figure 11:
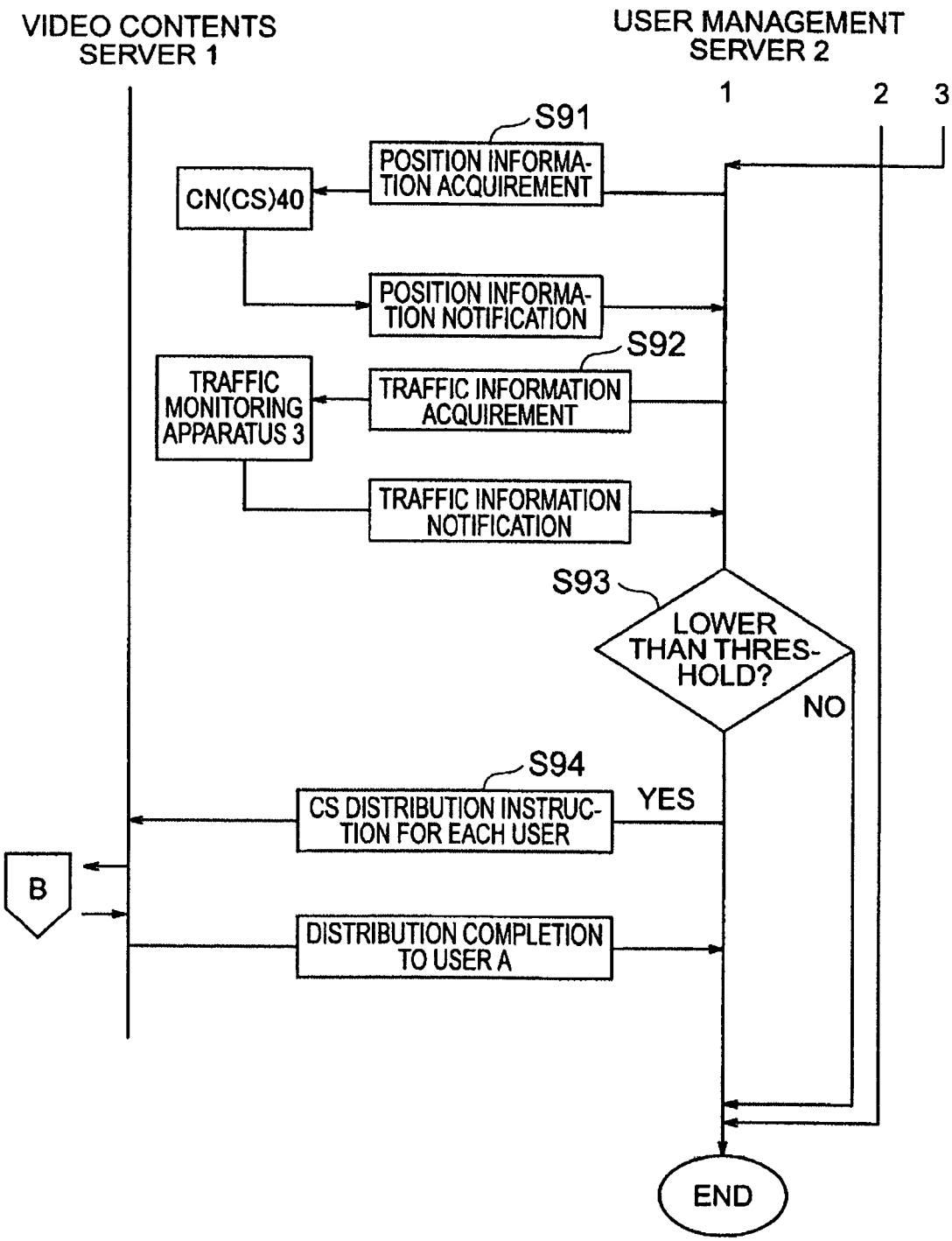
FIG. 11 is a portion of a flowchart for explaining an operation of the system for realizing a method for distributing video information to a mobile phone based on push technology of the third embodiment according to the present invention.

| [Explanation of reference numerals] | |
|---|---|
| 1: | video contents server |
| 2: | user management server |
| 3: | traffic monitoring apparatus |
| 4: | audio automatic responding apparatus |
| 5: | mobile phone |
| 10: | Internet network |
| 20: | PSTN |
| 30: | CN (PS) |
| 40: | CN (CS) |
| 50: | UTRAN (radio access network) |

The invention claimed is:

1. A method for distributing video information to a mobile phone from a video contents server, based on push technology, said video contents server configured to store therein the video information to be distributed, under control of a user management server which controls user registration and video information distribution, comprising:

registering a user request for a video information distribution service about an area to the user management server in advance;

detecting that the mobile phone exists in the area;

when said detecting results in a detection of the mobile phone exists in the area, distributing the video information about the area from the video contents server to the mobile phone based on said push technology, and only if the video information has not already been provided to the mobile phone that is not in use, displaying the video information in real time;

when said video information is distributed from the video contents server to the mobile phone while a user is using the mobile phone, causing the mobile phone to save the distributed video information;

when the video information is distributed from the video contents server to the mobile phone while the user is not using the mobile phone, causing the mobile phone to display the distributed video information for only a time period, and thereafter causing the mobile phone to stop displaying the video information while the user is still not using the mobile phone and save the remaining video information distributed after the time period has elapsed; and causing the mobile phone to display the saved video information on the basis of a user's instruction.

2. A method for distributing video information to a mobile phone from a video contents server, based on push technology, said video contents server configured to store therein the video information to be distributed, under control of a user management server which controls user registration and video information distribution, comprising:

registering a user request for a video information distribution service about an area to the user management server in advance;

detecting traffic of a radio channel connected to the mobile phone;

only when the detected traffic is lower than a threshold, distributing video information from the video contents server to the mobile phone based on said push technology;

when said video information is distributed from the video contents server to the mobile phone while a user is using the mobile phone, causing the mobile phone to save the distributed video information;

when the video information is distributed from the video contents server to the mobile phone while the user is not using the mobile phone, causing the mobile phone to display the distributed video information for only a time period, and thereafter causing the mobile phone to stop displaying the video information while the user is still not using the mobile phone and save the remaining video information distributed after the time period has elapsed; and causing the mobile phone to display the saved video information on the basis of a user's instruction.

3. A method for distributing video information to a mobile phone from a video contents server, based on push technology, said video contents server configured to store therein the video information to be distributed, under control of a user management server which controls user registration and video information distribution, comprising:

registering a user request for a video information distribution service to the user management server in advance;

detecting that the mobile phone exists in a specific area;

detecting traffic of a radio channel connected to the mobile phone at a time when existence of the mobile phone in the specific area has been detected; and only when the detected traffic is lower than a threshold, distributing video information about the specific area from the video contents server to the mobile phone based on said push technology;

when said video information is distributed from the video contents server to the mobile phone while a user is using the mobile phone, causing the mobile phone to save the distributed video information;

when the video information is distributed from the video contents server to the mobile phone while the user is not using the mobile phone, causing the mobile phone to display the distributed video information for only a time period, and thereafter causing the mobile phone to stop displaying the video information while the user is still not using the mobile phone and save the remaining video information distributed after the time period has elapsed; and causing the mobile phone to display the saved video information on the basis of a user's instruction.

4. A system for distributing video information based on push technology, comprising:

a mobile phone that receives said video information from a video contents server configured to store therein the video information to be distributed; and a user management server which controls user registration and video information distribution, wherein said video contents server is under control of said user management server, wherein a user request for a video information distribution service about an area to the user is received by said user management server in advance, wherein only when the mobile phone is in the area, said video information about the area is distributed from the video contents server to said mobile phone via said push technology, and only if the mobile phone is not in use and the video information has not already been provided, the video information is displayed in real time, and wherein when said video information is distributed from the video contents server to the mobile phone while a user is using the mobile phone, causing the mobile phone to save the distributed video information, and further wherein when the video information is distributed from the video contents server to the mobile phone while the user is not using the mobile phone, the mobile phone displays the distributed video information for only a time period, and thereafter the mobile phone stops displaying the video information while the user is still not using the mobile phone and saves the remaining video information distributed after the time period has elapsed, and the mobile phone displays the saved video information in response to a user's instruction.

5. A system for distributing video information based on push technology, comprising:

a mobile phone that receives said video information from a video contents server configured to store therein the video information to be distributed;

a user management server which controls user registration and video information distribution via a network, wherein said video contents server is under control of said user management server, wherein a user request for a video information distribution service about an area to the user is received by said user management server in advance; and a traffic monitoring apparatus that measures a traffic level of a radio channel to which the mobile phone is connected, wherein only when said traffic is lower than a threshold and said mobile phone is in the area, said video information about the area is distributed from the video contents server to said mobile phone via said push technology, and only if the mobile phone is not in use and the video information has not already been provided, the video information is displayed in real time, and wherein when said video information is distributed from the video contents server to the mobile phone while a user is using the mobile phone, the mobile phone saves the distributed video information, and further when the video information is distributed from the video contents server to the mobile phone while the user is not using the mobile phone, the mobile phone displays the distributed video information for only a time period, and thereafter the mobile phone stops displaying the video information while the user is still not using the mobile phone and saves the remaining video information distributed after the time period has elapsed, and the mobile phone displays the saved video information in response to a user's instruction.

* * * * *